Oct. 15, 1963  L. T. BROWN  3,107,129

GAS LUBRICATED BEARING SYSTEM

Filed Feb. 13, 1962

INVENTOR.
Larry T. Brown.
BY
Harry R. Dumont
ATTORNEY.

United States Patent Office 3,107,129
Patented Oct. 15, 1963

3,107,129
GAS LUBRICATED BEARING SYSTEM
Larry T. Brown, Warren, Mich., assignor to Chrysler Corporation, Highland Park, Mich., a corporation of Delaware
Filed Feb. 13, 1962, Ser. No. 173,064
3 Claims. (Cl. 308—122)

This invention relates generally to gas lubricated bearings, and, more particularly, to a gas lubricated bearing system which has a transitional operation in both the hydrodynamic and hydrostatic modes.

The hydrodynamic bearing is basically one in which the rotating element or journal is supported by the pressure wedge effect of the gas caused by the rotation of the journal in its enclosing bearing. The journal thus virtually generates its own supporting gas, circulating it throughout the bearing clearances to provide both bearing support and inter-surface lubrication. It will be seen that, during the low speeds of rotation which occur during starting up, a metal to metal contact will result between bearing and journal until sufficient pressure has been generated to separate the two. A similar problem exists in the stopping of rotation. Limitations of the hydrodynamic bearing are thus obvious. During the journal stopping and starting operation, not only the load bearing characteristics but the lubrication and wear characteristics of the bearing itself are poor.

The second type of gas bearing, the hydrostatic type, is one in which the elements having a rotation one relative to the other, namely, the bearing and journal, are again separated with a mechanical clearance. However, the supporting and lubricating gas is supplied by an external pressure source. The pressure is generally fed from the source through the bearing through a plurality of orifices or, alternately, through a porous element. It will be seen that the basic advantage of the hydrostatic type of bearing is that it supports the journal element during both static and dynamic operation. The limitation upon the operation of hydrostatic bearings is the requirement of a constant pressure and a large capacity source of gas for operation.

Accordingly, it is an object of this invention to provide a gas lubricated bearing system which combines the advantages of hydrostatic and hydrodynamic modes of operation.

It is an additional object of this invention to provide a gas lubricated bearing system capable of operation in both hydrodynamic and hydrostatic modes and with an uninterrupted operation during the transition between the two stages.

It is a further object of this invention to provide a gas lubricated bearing system in which the transition from hydrodynamic to hydrostatic mode of operation is made responsive to and concurrent with attainment of a predetermined rate of rotation of the journal as determined by its displacement from a normal hydrodynamic operating position.

It is a still further object of this invention to provide a gas bearing system in which the bearing has substantially constant load bearing characteristics during operation at both low and high speeds of rotation.

In accordance with the foregoing objects and others, the present invention, first briefly described, comprises a hydrodynamic wedge-type bearing in which a bearing has formed on its internal circumference at least one internal longitudinal step portion and has a journal member mounted for rotation therein with a mechanical clearance therefrom. A source of pressurized gas is provided with a porous metal outlet for the gas mounted on, coplanar with the inner surface of the bearing, and substantially coextensive in length with the bearing. A transducing means is mounted on the bearing which monitors the displacement of the journal from its normal hydrodynamic operating position and is operable to initiate gas flow from the source of pressurized gas to the outlet whenever additional lubricating gas is required to support the journal.

To illustrate the present invention and its mode of operation, reference may be made to the accompanying drawings, in which.

Figure 1:
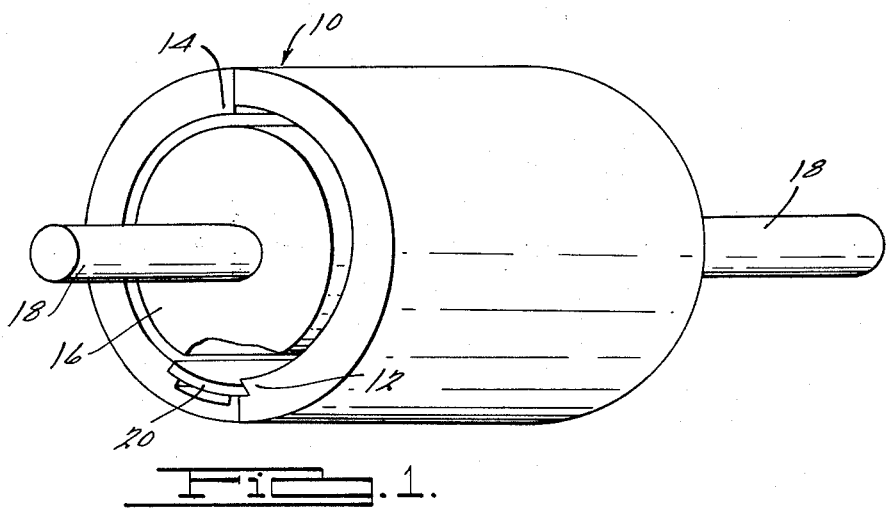
FIGURE 1 is an elevation of the gas lubricated bearing with a portion of the journal broken away to illustrate the mode of construction.

Referring to the drawings, FIGURE 1 shows a hydrodynamic wedge-type bearing modified in accordance with the present invention. The bearing 10 is formed with a pair of internal step portions 12 and 14. It will be seen that step portions 12 and 14 extend throughout the length of bearing 10 and are of gradually increasing height in the direction of rotation of the journal 16 which is indicated by an arrow as being clockwise. Journal 16 is incorporated, in the usual manner, as a cylindrical enlargement of driven shaft 18. Journal 16, further, is mounted internally of bearing 10 with a mechanical clearance therefrom sufficient to permit hydrodynamic operation with support and lubrication of the journal by the gas pressure generated between journal 16 and steps 12 and 14 of bearing 10. Bearing 10, further, has an element herein embodied as a porous metal insert 20 which is used as an outlet for an external gas pressure supply into the space between bearing 10 and journal 16. Porous metal insert 20 may be formed of a porous bronze material of a type well known in the art. It will be noted that insert 20 is located in step 14 at an area of its minimum height and in a vacuum portion of the pressure pattern generated during hydrodynamic operation of the device. The placement of insert 20 with its upper surface flush with the surface of step 14 eliminated possible detrimental effects by the insert on the hydrodynamic load carrying capacity of the bearing. It further promoted smooth transition of the bearing from hydrodynamic to hydrostatic operation, when required. To provide uniform support of the journal 16 during hydrostatic operation, insert 20 was made coextensive in length with bearing 10 and with journal 16.

Figure 2:
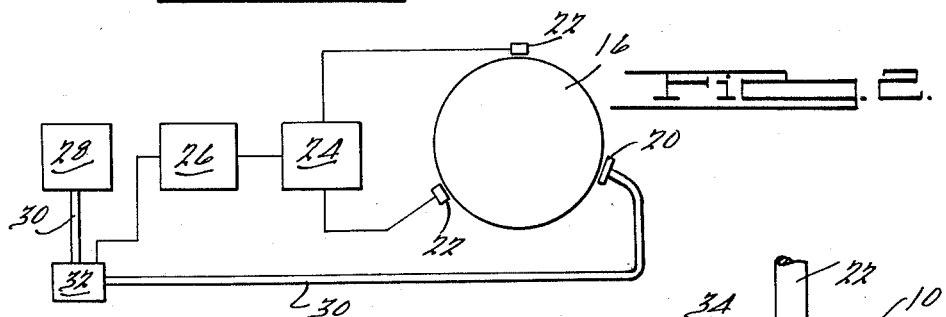
FIGURE 2 is a functional block diagram of the gas bearing system.
Figure 4:
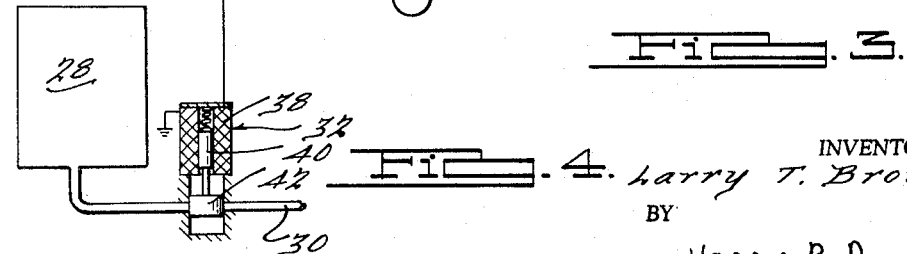
FIGURE 4 is an electrical schematic and diagrammatic drawing of the control system utilized in the present invention.

FIG. 2 is a block diagram showing the control system for determining and changing the mode of operation of the bearing between hydrodynamic and hydrostatic states. A pair of transducing means 22 are cooperable with journal 16 and operable to give an output signal responsive to the radial movement of journal 16 from its normal hydrodynamic operating position. Transducing means 22 may be capacitance probes, inductance probes, pressure responsive strain gage elements, or the like. The output from the transducing means 22 is utilized in a balance bridge 24 to provide a voltage output through a mixer 26 representative of the magnitude of the displacement of journal 16 from a predetermined normal hydrodynamic operating position which normally would be concentric with bearing 10 and equidistant from the surface of steps 12 and 14 formed thereon. In the hydrodynamic operation of the journal 16, when a predetermined rate of rotation is attained sufficient to float the journal in bearing 10, no output is produced from the transducing means. The electrical control signal from transducing means 22 is utilized to control the flow of gas between an external supply source 28 and the porous metal outlet provided through bearing 10 by insert 20. A conduit 30 is provided between source 28 and insert 20. The flow of pressurized gas through conduit 30 is controlled by a solenoid actuated valve 32, the detail of which will be shown in connection with FIGURE 4, hereinafter.

Figure 3:
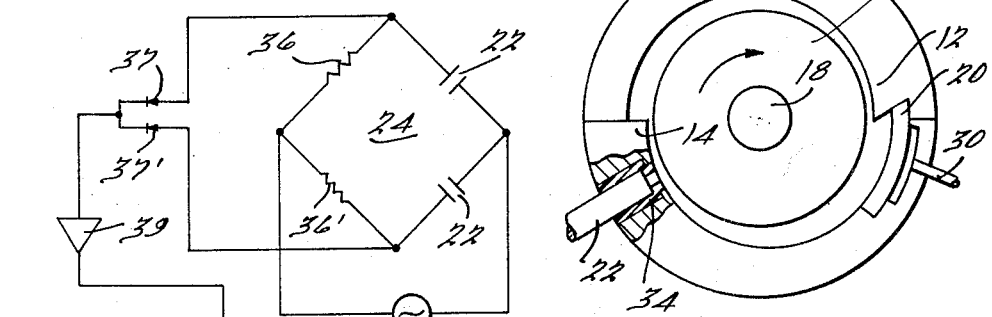
FIGURE 3 is an end view of the bearing illustrating placement of the transducing means employed.

FIGURE 3 shows a preferred embodiment of the present invention in which the transducing means 22 utilized is a pair of capacitance probes 22. Capacitance probes 22 extend through bearing 10 and are insulated therefrom by insulating sheaths 34. The function of capacitance probes 22 is to continually monitor the position of journal 16 with reference to a fixed position of bearing 10. The electrical output signals are utilized in a manner shown by FIGURE 4 which shows the components of a balance bridge 24. The values of resistors 36 and 36' are adjusted so that when journal 16 is properly centered due to hydrodynamic action, no voltage output will be produced through mixer 26 which includes diodes 37 and 37'. When excessive vibration or load is present in the system the voltage output through diode 37 or 37', depending on the direction of movement from its centered position of journal 16, will initiate the action of solenoid operated valve 32. Valve 32 comprises a solenoid winding 38 and a spring-loaded working core 40. Coupled to core 40 is a piston 42 which controls the passage of pressurized gas to insert 20 through conduit 30. Upon receipt of a voltage output of sufficient magnitude from diodes 37 or 37', and through amplifier 39, valve 32 will open to admit gas to provide hydrostatic operation of the bearing. When the journal 16 is operating at a rate of rotation sufficient to provide hydrodynamic operation of the bearing, valve 32 will close, thus conserving the supply available from pressurized source 28 and affording a smooth and timely transition from hydrostatic to hydrodynamic action.

It will thus be seen, that, by the present invention, I have provided a gas bearing system in which the requirements for pressurized gas have been substantially reduced and in which metal to metal contact is eliminated at virtually all rates of rotation. Additionally, the structure of the present bearing system provides a relatively constant performance during all speeds of operation.

I claim:

1. A gas bearing system comprising a journal, a bearing having a plurality of lands on the internal circumference thereof parallel to the axis of rotation of said journal, said lands being progressively greater in height in the direction of rotation of said journal, a source of pressurized gas, a porous metal outlet for said source mounted on said bearing proximate an area of minimum height on one of said lands, said porous metal outlet being coplanar with the inner surface of said bearing and coextensive in length with said bearing, and means operatively connected to and controlling the flow of gas from said source operative to initiate flow to said output responsive to the rate of rotation of said journal below a predetermined rate and operable to inhibit flow to said outlet responsive to rotation of said journal above the predetermined rate.

2. A gas bearing system comprising a journal, a bearing having a plurality of lands on the internal circumference thereof parallel to the axis of rotation of said journal, said lands being progressively greater in height in the direction of rotation of said journal, a source of pressurized gas, a porous metal outlet for said source mounted on said bearing proximate an area of minimum height on one of said lands, said porous metal outlet being coplanar with the inner surface of said bearing and coextensive in length with said bearing, transducing means mounted on said bearing and operable to control the flow of gas from said source responsive to the displacement of said journal from a predetermined position.

3. A gas bearing system comprising a journal, a bearing having a plurality of lands on the internal circumference thereof parallel to the axis of rotation of said journal, said lands being progressively greater in height in the direction of rotation of said journal, a source of pressurized gas, a porous metal outlet for said source mounted on said bearing proximate an area of minimum height of one of said lands, said porous metal outlet being coplanar with the inner surface of said bearing and coextensive in length with said bearing, variable capacitance means mounted on and insulated from said bearing and operable to provide a voltage output signal proportional to the displacement of said journal from a normal hydrodynamic operating position, and an electrically operable valve connected intermediate said source and said outlet, said valve being electrically connected to and controlled by the signal from said variable capacitance means.

References Cited in the file of this patent

UNITED STATES PATENTS

| | | |
|---|---|---|
| 2,899,243 | Acterman | Aug. 11, 1959 |
| 2,937,294 | Macks | May 7, 1960 |